Patented Feb. 26, 1935

1,992,637

UNITED STATES PATENT OFFICE 1,992,637

PRODUCTION OF NITROSO COMPOUNDS OF COBALT

Leo Schlecht, Ludwigshafen-on-the-Rhine, Guenther Hamprecht, Oppau, and Fritz Spoun, Ludwigshafen-on-the-Rhine, Germany, assignors to I. G. Farbenindustrie Aktiengesellschaft, Frankfort-on-the-Main, Germany No Drawing. Application July 18, 1932, Serial No. 623,294. In Germany July 25, 1931

15 Claims. (Cl. 23—203)

The present invention relates to the production of nitroso compounds of cobalt and to a new compound of this class.

We have found that nitroso compounds of cobalt, for example the cobalt nitrosocarbonyl of the formula $Co(CO)_3(NO)$, which has hitherto been obtained simply by the action of nitric oxide, i. e., NO, on the finished cobalt carbonyl, are obtained in a simple manner by causing oxides of nitrogen higher than nitrous oxide i. e., $N_2O$, or gases containing such oxides of nitrogen, preferably nitrogen monoxide, i. e., NO, if desired together with carbon monoxide, or gases containing carbon monoxide, to act on cobalt, or materials containing the same in the metallic state.

The nature of the nitroso compounds of cobalt obtainable by this process varies with the particular conditions employed and more particularly with the ratio of carbon monoxide to the said oxides of nitrogen. Thus the formation of the cobalt nitrosocarbonyl takes place when only a few per cent of the oxides of nitrogen are present in the carbon monoxide. The ratio of the proportions of the oxides of nitrogen and carbon monoxide may be varied within comparatively wide limits, for example, the gas mixture may contain 2 per cent or more of the oxides of nitrogen. When mixtures of carbon monoxide with more than 5 per cent of the nitrogen oxides are used, a new nitroso compound of cobalt, namely cobalt nitrosyl is obtained in addition to cobalt nitrosocarboyl, the amount of cobalt nitrosyl formed being the greater and that of cobalt nitrosocarbonyl being the lower, the higher the percentage of the nitrogen oxides in the gas; with a mixture containing about 15 per cent or more of the nitrogen oxides, cobalt nitrosyl is obtained practically exclusively.

The process according to the present invention is usually carried out in the manner which is customary for the production of metal carbonyls by the action of carbon monoxide or gases containing carbon monoxide on metals. Thus the operation may be carried through at atmospheric pressure, but it is also possible to work at reduced or increased pressure. The reaction proceeds very readily even at room temperature and atmospheric pressure, but generally speaking it is more preferable to work at elevated temperatures; however, as a rule the temperature should not exceed 200° C. at atmospheric pressure or 250° C. at high pressures of for example 200 atmospheres. The employment of increased pressure is recommended for example when, in order to increase the reactivity of the initial material containing cobalt, high temperatures, as for example about 250° C. are necessary.

When mixture of the oxides of nitrogen with carbon monoxide are used, the oxides of nitrogen may be incorporated with the carbon monoxide before its entry into the reaction chamber, or the nitrogen oxides may be introduced separately into the latter. In any case regard should be had, however, especially when working under increased pressure, to the explosion limits of the mixture, and for this reason great caution is necessary when working with gases containing 20 per cent or more of the oxides of nitrogen.

The reaction gases need not be pure, but may contain large amounts of inert gases. Thus, when working under elevated pressure, cobalt nitrosyl can be produced successfully by means of a gas containing only from 2 to 3 per cent of nitrogen monoxide and from 98 to 97 per cent of nitrogen. Similarly, instead of carbon monoxide, industrial gases, such as water gas, may be employed after they have been freed when necessary from undesirable substances, such as hydrogen or carbon dioxide.

When cobalt nitrosocarbonyl is to be produced, it is possible to employ, instead of all or part of the oxides of nitrogen substances supplying oxides of nitrogen, as for example nitrates or liquid solutions of oxides of nitrogen. In the said case these substances are therefore to be regarded as equivalents of the oxides of nitrogen.

As has been pointed out above, oxides of nitrogen higher than nitrous oxide must be used according to the present invention, because nitrous oxide does not give rise to the formation of nitroso compounds of cobalt. Of course, nitrous oxide may be present in addition to higher oxides of nitrogen and then behaves as an inert gas like nitrogen. Nitrogen monoxide (nitric oxide) is most suitable for the purposes of the present invention, because when using still higher oxides of nitrogen oxidation of the cobaltiferous initial material is liable to occur whereby the progress of the reaction may be prevented.

The cobalt-containing initial material, as for example cobalt metal itself or cobalt compounds, which can be reduced to metallic cobalt, which may be used in the form of waste products containing cobalt in comparatively small amounts, is advantageously employed in a finely divided form having a large surface. It is of special industrial importance to use ores, intermediate and waste products, such as scrapings, dried slimes, or slags. The formation of the nitroso compounds may be preceded by a pretreatment of the reaction material, such as roasting, decomposition, conversion into oxides, or loosening in order to increase the superficial area or to convert the material into the metallic state. Substances may also be added which facilitate the formation of the nitroso compounds, such as copper. Especially when working with mixtures of carbon monoxide and nitrogen oxides at atmospheric pressure, it is preferable to use the cobalt-containing initial material in the metallic form or to subject it previously to a reducing treatment. This may be effected with gaseous reducing agents, such as hydrogen or carbon monoxide or gas mixtures containing the same, as for example water gas or producer gas, or with solid or liquid carbonaceous substances, such as coal or coke, or oils, waste products containing oil, such as residues from the destructive hydrogenation of carbonaceous materials.

When carrying through the operation in the presence of large amounts of reducing gases such as carbon monoxide, it is not absolutely necessary to first convert the cobalt into the metallic state, because in this case reduction may take place simultaneously with the production of the nitroso compound.

If the formation of the nitroso compounds of cobalt comes to a standstill before the cobalt is used up, a reduction, if desired after a previous oxidation, is required for promoting the further conversion.

The reaction is also suitable for working up materials, as for example nickel, which only contain small amounts of cobalt. When working with mixtures of nitrogen oxides and carbon monoxide, the formation of other volatile metal compounds, in particular metal carbonyls, is suppressed by employing such initial materials in a compact form, so that nitroso compounds of cobalt practically free from foreign metals are obtained. It is also possible, however, to obtain the nitroso compounds of cobalt in admixture with other metal compounds; the mixture may then be fractionated, as for example distilled in a stream of carbon monoxide, or fractionally crystallized.

The nitroso compounds of cobalt obtainable according to this invention may be worked up in a very advantageous manner into other cobalt compounds or into cobalt itself. For this purpose they are either burned with air or oxygen with the formation of cobalt oxide, or they are thermally decomposed, advantageously in a heated reaction vessel of sufficient width to prevent any substantial contact of vapours with the hot walls of the vessel, if desired in the presence of inert or reducing gases, especially reducing gases such as hydrogen, or the conversion is effected by chemical agents, such as strong mineral acids with the formation of cobalt salts. When desired, the cobalt oxide obtained by the thermal decomposition or burning may be subjected to a further working up, as for example a reduction to finely divided metallic cobalt.

The importance of the process according to this invention resides mainly in the fact that it renders possible the working up of cheap cobalt-containing crude materials into high quality pure products in an economical manner.

The new cobalt nitrosyl forms dark brown crystals which are similar in appearance to those of potassium permanganate and which can be sublimed without decomposition in vacuo at about 60° C. According to analysis the product has the formula $Co(NO)_3$. It decomposes in contact with the air and is converted by means of water into cobalt nitrate and basic cobalt nitrate while nitric oxide is evolved.

The following examples will further illustrate the nature of this invention, but the invention is not restricted to these examples.

*Example 1*

A precipitate obtained by adding lime to a solution of cobalt sulphate is reduced at 350° C. with hydrogen and then treated at from 60° to 70° C. and atmospheric pressure with a mixture of carbon monoxide with about 5 per cent of nitric oxide. Cobalt nitrosocarbonyl is obtained in a good yield as a red liquid.

The liquid is evaporated into a heated reaction vessel wherein the cobalt nitrosocarbonyl is decomposed whereby mainly cobalt oxide is obtained; the gas thus set free is employed for the formation of further amounts of nitrosocarbonyl.

*Example 2*

Cobalt nitrate solution is evaporated to dryness with lime and the resulting mass containing calcium nitrate is treated with flowing carbon monoxide at 240° C. under a pressure of 200 atmospheres. The cobalt nitrosocarbonyl thus formed is carried out from the reaction chamber by the stream of carbon monoxide. It is obtained in a liquid form by cooling.

*Example 3*

An industrial waste product mainly composed of calcium sulphate and oxides of iron, copper and cobalt and containing 7 per cent of cobalt is dried and then reduced by means of hydrogen at 300° C. and under atmospheric pressure in the course of 14 hours. The resulting product is acted upon at between 160° and 180° C. with carbon monoxide containing 5 per cent of nitric oxide. Up to 20 per cent of the cobalt present per day is converted into the nitrosocarbonyl.

*Example 4*

A reduced material containing cobalt prepared as described in Example 3 is treated at 150° C. and under atmospheric pressure with carbon monoxide containing 10 per cent of nitrogen monoxide. In this way 20 per cent of the cobalt present per day is converted into cobalt nitrosyl containing about 15 per cent of cobalt nitrosocarbonyl.

*Example 5*

A reduced material containing cobalt prepared as described in Example 3 is treated at between 150° and 180° C. and under atmospheric pressure with nitrogen containing 3 per cent of nitrogen monoxide. In this way 8 per cent of the cobalt present per day is converted into cobalt nitrosyl.

In the foregoing description and examples all percentages relating to gas composition are given in per cent by volume, all other percentages being in per cent by weight.

What we claim is:

1. The process of producing a nitroso compound of cobalt which comprises acting with a gas comprising nitrogen monoxide on a material comprising metallic cobalt.

2. The process of producing a nitroso compound of cobalt which comprises acting with a gas comprising nitrogen monoxide at a temperature not exceeding 250° C. on a material comprising metallic cobalt.

3. The process of producing a nitroso compound of cobalt which comprises acting with a gas comprising nitrogen monoxide at a temperature not exceeding 250° C. and under superatmospheric pressure on a material comprising metallic cobalt.

4. The process of producing a nitroso compound of cobalt which comprises acting with a gas comprising nitrogen monoxide and carbon monoxide on a material comprising metallic cobalt.

5. The process of producing a nitroso compound of cobalt which comprises acting with a gas comprising nitrogen monoxide and carbon monoxide at a temperature not exceeding 250° C. on a material comprising metallic cobalt.

6. The process of producing a nitroso compound of cobalt which comprises acting with a gas comprising nitrogen monoxide and carbon monoxide at a temperature not exceeding 250° C. and under superatmospheric pressure on a material comprising metallic cobalt.

7. The process of producing cobalt nitrosocarbonyl which comprises acting with a gas comprising carbon monoxide and substantial amounts, not exceeding 15 per cent by volume of the carbon monoxide, of nitrogen monoxide on a material comprising metallic cobalt.

8. The process of producing cobalt nitrosocarbonyl which comprises acting with a gas comprising carbon monoxide and substantial amounts, not exceeding 15 per cent by volume of the carbon monoxide, of nitrogen monoxide at a temperature not exceeding 250° C. on a material comprising metallic cobalt.

9. The process of producing cobalt nitrosocarbonyl which comprises acting with a gas comprising carbon monoxide and substantial amounts, not exceeding 15 per cent by volume of the carbon monoxide, of nitrogen monoxide at a temperature not exceeding 250° C. and under superatmospheric pressure on a material comprising metallic cobalt.

10. The process of producing cobalt nitrosyl which comprises acting with a gas comprising carbon monoxide and substantial amounts, exceeding 15 per cent by volume of the carbon monoxide, of nitrogen monoxide on a material comprising metallic cobalt.

11. The process of producing cobalt nitrosyl which comprises acting with a gas comprising carbon monoxide and substantial amounts, exceeding 15 per cent by volume of the carbon monoxide, of nitrogen monoxide at a temperature not exceeding 250° C. on a material comprising metallic cobalt.

12. The process of producing cobalt nitrosyl which comprises acting with a gas comprising carbon monoxide and substantial amounts, exceeding 15 per cent by volume of the carbon monoxide, of nitrogen monoxide at a temperature not exceeding 250° C. and under superatmospheric pressure on a material comprising metallic cobalt.

13. The process of producing cobalt nitrosyl which comprises acting with a gas comprising nitrogen monoxide, but free from carbon monoxide on a material comprising metallic cobalt.

14. The process of producing cobalt nitrosyl which comprises acting with a gas comprising nitrogen monoxide, but free from carbon monoxide at a temperature not exceeding 250° C. on a material comprising metallic cobalt.

15. Cobalt nitrosyl of the formula $Co(NO)_3$ characterized in that it forms brown crystals.

LEO SCHLECHT.
GUENTHER HAMPRECHT.
FRITZ SPOUN.